United States Patent [19]

Goupy et al.

[11] 4,154,469
[45] May 15, 1979

[54] ENERGY ABSORBING DEVICE

[75] Inventors: Marcel Goupy; Pierre Roubinet, both of Boulogne-Billancourt, France

[73] Assignees: Regie Nationale des Usines Renault, Boulogne-Billancourt; Automobiles Peugeot, Paris, both of France

[21] Appl. No.: 833,959

[22] Filed: Sep. 16, 1977

[30] Foreign Application Priority Data

Sep. 21, 1976 [FR] France ............................... 76 28255

[51] Int. Cl.² ........................................... B60R 19/04
[52] U.S. Cl. ..................................... 293/120; 293/133
[58] Field of Search ................. 114/219; 293/62, 63, 293/65, 71 R, 71 P, 87, 88, 98, 70; 267/139, 140; 188/1 C

[56] References Cited

U.S. PATENT DOCUMENTS

| 3,512,822 | 5/1970 | Rich et al. | 293/70 |
| 3,721,433 | 3/1973 | Sobel | 293/71 R |
| 3,744,835 | 7/1973 | Carbone et al. | 293/71 R |
| 4,022,505 | 5/1977 | Saczawa, Jr. | 293/70 |
| 4,029,350 | 6/1977 | Goupy et al. | 293/71 R |

*Primary Examiner*—Trygve M. Blix
*Assistant Examiner*—Jesus D. Sotelo
*Attorney, Agent, or Firm*—Fleit & Jacobson

[57] ABSTRACT

The energy absorbing device for use as a composite bumper on a vehicle comprises a deformable unit providing a constant energy absorption, the unit being disposed in contact with a resisting structure and a flexible shield, and consisting of a number of energy absorbing members, each energy absorbing member being formed by the juxtaposition of a plurality of elongated hollow members having different lengths. Provision is made within the energy absorbing device of sections having an increasing impact resistance as the impact stress causes the energy absorbing device to be crushed, the stiffness of the energy absorbing device being thus enhanced as a function of the driving in thereof.

2 Claims, 11 Drawing Figures

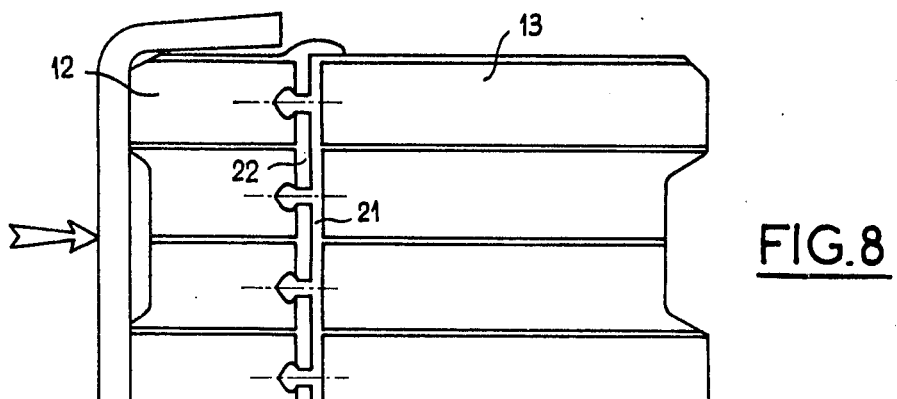
FIG.8
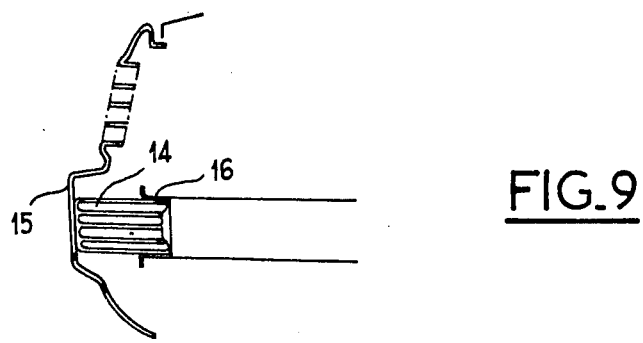
FIG.9
FIG.10  FIG.11
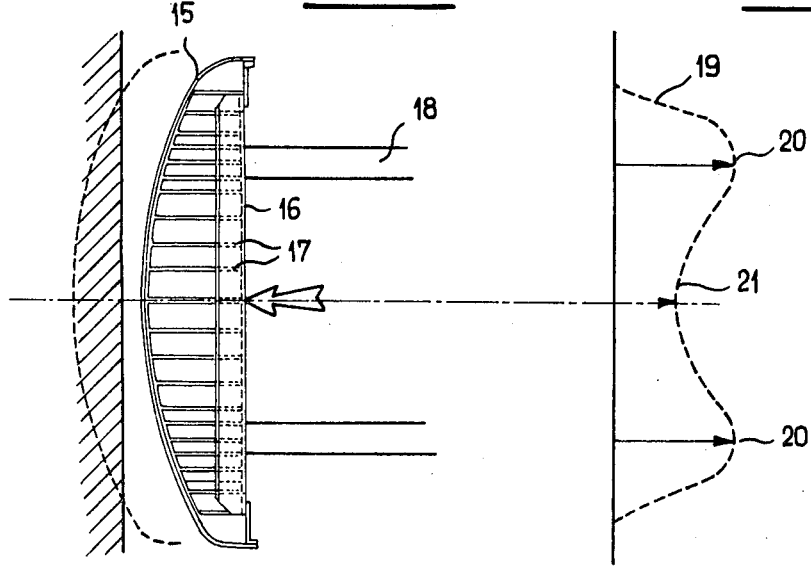

ENERGY ABSORBING DEVICE

The invention relates to an energy absorbing device for use as a composite bumper on an automotive vehicle.

In French Pat. No. 74/07434, there was already disclosed a composite bumper comprising absorbing members formed by the juxtaposition of a plurality of elongated hollow members molded in synthetic material. According to a main feature of said bumper, there was provided a constant stress absorption during the impact deformation period or driving in, due to the modification of the profile of said bumper bearing surface in contact with the bumper beam or vehicle chassis.

It has now been found that such a modification is further advantageous when one wishes to increase the temperature gap in which said bumpers are efficient, particularly when they have been molded in cheap synthetic materials which are sensitive to temperature variations, such as lower polyethylen. In fact the mechanical characteristics of absorbing devices obtained from synthetic materials of this type are damaged when they are subjected to temperature in the range of $-20°$ or $+40°$ C. for a long period of time.

It is an object of the invention to eliminate the disadvantages stated hereinabove. It is another object of the invention to provide an energy absorbing device for use as a composite bumper on a vehicle comprising a deformable unit providing a constant energy absorption, said unit being disposed in contact with a resisting structure and a flexible shield, and consisting of a number of energy absorbing members, each energy absorbing member being formed by the juxtaposition of a plurality of elongated hollow members having different lengths, said energy absorbing device being further characterized in that provision is made within said device of sections having an increasing impact resistance as the impact stress causes said absorbing device to be crushed, the stiffness of said device being thus enhanced as a function of the driving in thereof.

This improved energy absorbing device is further characterized by the following features:

Said sections wherein the resistance is increased during the impact period are formed by providing within said hollow elongated member a structure consisting of a plurality of longitudinal partitions crossing at right angle to each other, each having a length different from each other but less than the length of the relative hollow elongated member.

The vertical partition forming the rear end of the absorbing member is more or less located far from the front end thereof, as to provide a certain stiffness staggering in said member.

The thickness of the walls of said hollow elongated member is increasingly varying towards the rear end of said absorbing member, as to obtain a certain stiffness staggering in said member.

The absorbing member comprises a first front section and a second rear section, separated from each other by means of a vertical partition, each section being molded in a synthetic material whose tension modulus is different from that of the material constituting the other section.

The absorbing unit is located along the whole length of the composite bumper and is formed by the juxtaposition of elongated hollow members having different cross-sections, the number of separating partitions being greater at the level of the frame side members of the vehicle than that at any point adjacent to the bumper, whereas the number of partitions is the lowest at the level of the middle portion of the vehicle transverse beam secured to the front portion of said frame sidemembers.

Some embodiments of the present invention will now be described by way of example only, and not in any sense by way of limitation, reference being made to the accompanying drawings, in which:

FIGS. 6, 7, 8 show three different forms of embodiments of the absorbing device according to the invention, as cross-sectional views respectively;

FIG. 9 is a cross-sectional view taken along an axially vertical plan of yet another embodiment of the invention;

FIG. 10 is a cross-sectional view taken along an horizontally transverse plan in the device shown in FIG. 9; and, FIG. 11 is a graph showing the dispatching of the stresses when the absorbing device of FIG. 9 is impacted.

Figure 1:
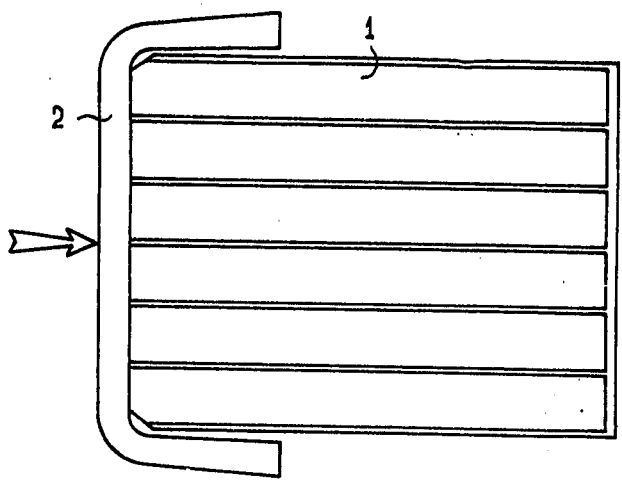
FIG. 1 is a cross-sectional view of an absorbing device of the known art.
Figure 2:
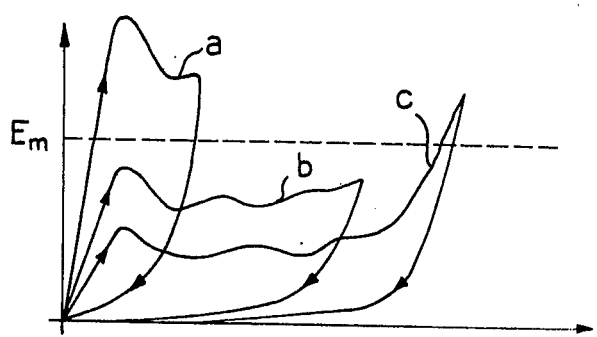
FIG. 2 shows graphs corresponding to the driving in stresses to which was subjected during a crushing impact the absorbing device of FIG. 1.

As shown in FIGS. 1 and 2, the absorbing device of the prior art is formed by the juxtaposition of elongated hollow members 1 having the same longitudinal length, said absorbing device having a front face evenly bearing on the bumper 2.

Upon impact of the vehicle, the kinetic energy might be eliminated by the mere deformation of the members constituting the absorbing device. This aim can be attained as far as the buckling stress imparted to said members is not greater than the maximum stress to which the structure on which bear said members may be subjected without breaking.

However, when the absorbing member shown in FIG. 1 is moulded in a material having a tension modulus which considerably varies with respect to the ambient temperature, one obtains for different temperature ranges the graphs shown in FIG. 2 wherein the stresses are along the y-axis and the driving in along the x-axis. The temperature conditions are as follows:

Curve a—impact at low temperature ($-20°$ C.)
Curve b—impact at ambient temperature ($+20°$ C.)
Curve c—impact at high temperature ($+40°$ C.).

It has to be noted that for a certain level of performance in case of impacts at ambient temperature, one should be satisfied with said known absorbing device which, when subjected to impacts at non-ambient temperatures which substantially could occur along long periods of time, e.g. one year, shows a lack of efficiency. In fact the maximal stress Em, to which said known structure may be subjected without breaking, is exceeded as soon as the bumper is subjected to an impact at low temperature, whereas at high temperature said maximal stress is exceeded at the end of the relative impact. The driving in at low temperature is slight, whereas at high temperature, it exceeds the buckling characteristics of the walls and partitions forming the absorbing units.

Figure 3:
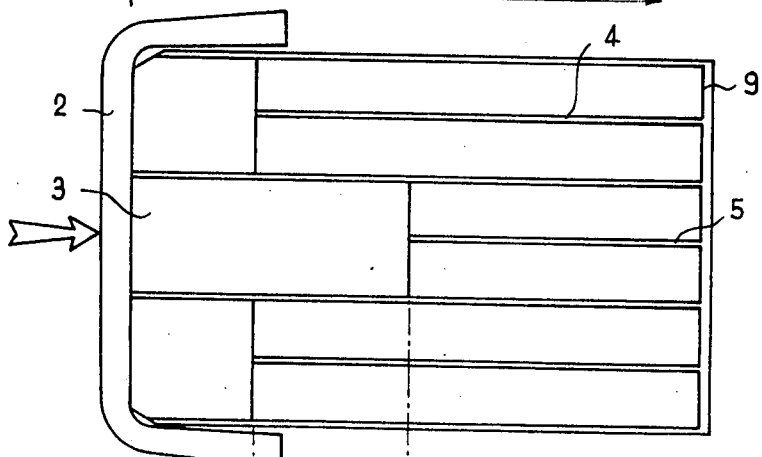
FIG. 3 is a cross-sectional view of a first embodiment of the absorbing device according to the invention.
Figure 5:
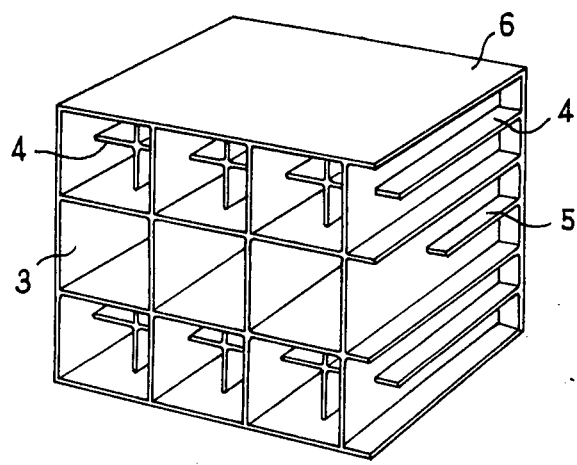
FIG. 5 is a perspective fragmentary view partially broken away of the absorbing device shown in FIG. 3.

The absorbing device shown in FIGS. 3 and 5 does not have said drawback. Said absorbing device consists of a molded box-shaped structure formed by the juxtaposition of hollow elongated members 3 provided with connecting partitions 4, 5 parallel to each other, the partitions having axial lengths different from each other, while in any case, said length is inferior to that of the relative absorbing unit 6. A vertical wall 9 forms the rear end of said absorbing unit.

Thus it has to be noted that the front face of said absorbing unit, which is abutting on the bumper, is only provided with a certain portion of the impact resistance capability that could be provided by the absorbing unit at the level of partitions 4 and 5, due to the fact that the number of partitions subjected to the impact stress increases as a function of the driving in.

As a result of said stiffness staggering and of the subsequent increase of the buckling power of said absorbing device, the maximum stress metered when the impacts occur within a large temperature range, never exceeds the maximal stress to which the vehicle structure may be subjected without breaking.

Figure 4:
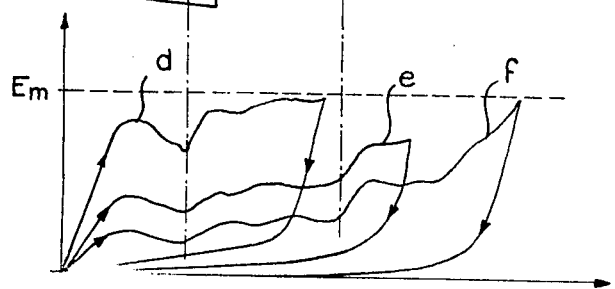
FIG. 4 shows graphs corresponding to the driving in stresses to which was subjected during a crushing impact the absorbing device of FIG. 3.

The graphs corresponding to the absorbing device of the invention are shown in FIG. 4. Curve d corresponds to an impact at low temperature ($-20°$ C.). Curve e corresponds to an impact at ambient temperature ($+20°$ C.). Curve f corresponds to an impact at high temperature ($+40°$ C.).

Figure 6:
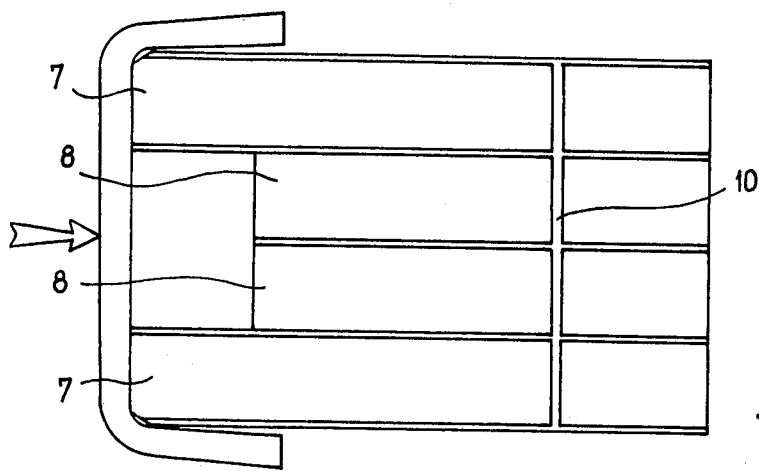

FIG. 6 shows an alternative embodiment of the absorbing device according to the invention, in which the juxtaposition of hollow elongated members 7-8 of different axial length are combined with a staggering of vertical partition 9, which was the rear end in the previous embodiment, toward a location 10 at a certain distance from the front face of said absorbing device.

According to said modified embodiment, two series of absorbing units having different stiffnesses have been stacked, so as to form parameters on which one can act, since it has been noted in fact that the buckling stress increases as partition 10 is located nearer from the front face of the absorbing device.

Figure 7:
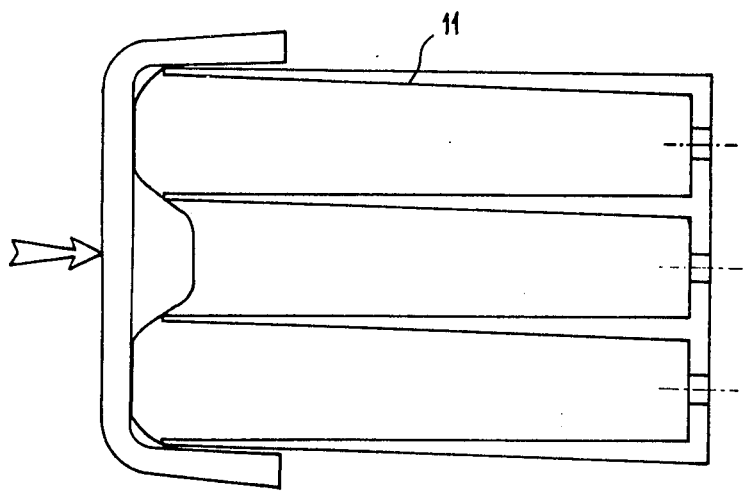

FIG. 7 shows another embodiment of the invention, in which, as to continuously vary the stiffness of the absorbing unit as a function of the driving in strength thereof, the thickness of partitions 11 limiting the hollow members is continuously varied, thus further improving the relief as well as the demoulding thereof.

FIG. 8 shows yet another form of embodiment according to the invention. In said embodiment, as to obtain the stiffness staggering of the absorbing device, the latter is moulded in two distinct portions 12 and 13 in synthetic materials having tension moduli different from each other. Thus use can be made of a heavy-duty material for the front member 12 which is more subjected to repeated slight impacts, whereas the bottom member 13 may be formed in a cheaper material.

It has been noted that both portions 12-13 are each provided at the connection thereof with a vertical partition 21-22 respectively with complementary securing means, for instance clamping means.

It should also be noted that the rear face of portion 13 has an uneven surface in contact with the vehicle beam, taking on account the contour of the front face of the absorbing device.

In FIGS. 9 and 10, the absorbing member 14 is located across the whole transverse length of the bumper, between a deformable front member 15 and a rigid transverse beam 16. It is advantageous in this case to vary the space limited by partitions 17 of the absorbing device as to dispatch the stresses to which is subjected the vehicle chassis with respect to the maximal stress permissible by the different constituting parts thereof.

Graph in FIG. 11 illustrates the properties of the embodiment shown in FIG. 10, wherein partitions 17 are more confined in close relationship to the side-frame beams 18 than in the middle area of transverse beam 16 capable of buckling; similarly, the stress curve shows two maxima 20 at the level of said side-frame beams and one minimum 21 at the level of said transverse beam.

What is claimed is:

1. In an energy absorbing device for use as a composite bumper on a vehicle comprising a deformable unit providing a constant energy absorption, the unit being disposed in contact with a resisting structure and a flexible shield and comprising a number of energy absorbing members, each energy absorbing member being formed by the juxtaposition of a plurality of elongated hollow members having different lengths, the improvement comprising forming, within said device, sections having an increasing impact resistance as impact stress causes said absorbing device to be crushed, said sections being formed by providing within said hollow elongated members structures comprising a plurality of longitudinal partitions crossing at right angles to each other and having different lengths, the lengths of partitions being less than the lengths of respective hollow elongated members, the stiffness of said device being thus enhanced as a function of the driving in thereof.

2. In an energy absorbing device for use as a composite bumper on a vehicle having frame side members with front portions interconnected by a vehicle transverse beam comprising a deformable absorbing unit providing a constant energy absorption, the absorbing unit being disposed in contact with a resisting structure and a flexible shield and comprising a number of energy absorbing members, each energy absorbing member being formed by the juxtaposition of a plurality of elongated hollow members having different lengths, the improvement wherein said absorbing unit is located along the whole length of the composite bumper and is formed by the juxtaposition of elongated hollow members having different cross-sections, and wherein end portions of the composite bumper are positioned adjacent front portions of the frame side members, the number of hollow members being greatest in the end portions of the composite bumper and being lowest in the middle portion of the composite bumper, said hollow members forming within said device sections having an increasing impact resistance as impact stress causes said absorbing device to be crushed, the stiffness of said device being thus enhanced as a function of the driving in thereof.

* * * * *